United States Patent [19]

Pine et al.

[11] Patent Number: 5,280,225
[45] Date of Patent: Jan. 18, 1994

[54] METHOD AND APPARATUS FOR MULTI-AXIS ROTATIONAL MOTION

[75] Inventors: Jerrold Pine, Boca Raton; Gary Blitman, Boynton Beach; Sunil Lakhani, Boca Raton, all of Fla.

[73] Assignee: Motorola, Inc., Schaumburg, Ill.

[21] Appl. No.: 871,087

[22] Filed: Apr. 20, 1992

[51] Int. Cl.$^5$ ............................................. H02K 5/167
[52] U.S. Cl. ........................................ 318/575; 318/38; 318/135; 310/13; 310/231; 310/258; 310/261
[58] Field of Search ................ 318/38, 575, 135, 576; 310/12, 13, 120, 123, 166, 231, 254, 258, 211

[56] References Cited

U.S. PATENT DOCUMENTS

| | | | |
|---|---|---|---|
| 3,178,600 | 4/1965 | Bers | 310/166 |
| 3,851,196 | 11/1974 | Hinds | 310/12 |
| 4,600,871 | 7/1986 | Idogaki et al. | 318/653 |
| 4,634,889 | 1/1987 | Foggia et al. | 307/104 |
| 4,707,642 | 11/1987 | Sorimachi et al. | 318/37 |
| 4,719,381 | 1/1988 | Miles | 310/166 |
| 4,739,241 | 4/1988 | Vachtsevanos et al. | 318/800 |
| 4,853,604 | 8/1989 | McMullin et al. | 318/653 |
| 4,874,998 | 10/1989 | Hollis, Jr. | 318/568.21 |
| 4,908,558 | 3/1990 | Lordo et al. | 318/648 |
| 4,947,067 | 8/1990 | Habermann et al. | 310/51 |
| 5,070,289 | 12/1991 | Pona, Jr. | 318/640 |

Primary Examiner—William M. Shoop, Jr.
Assistant Examiner—Brian Sircus
Attorney, Agent, or Firm—Daniel R. Collopy; Thomas G. Berry; Pablo Meles

[57] ABSTRACT

An apparatus for multi-axis rotational motion includes a spherical structure (102) and a housing (104), the housing (104) at least partially enclosing the spherical structure (102) and movably coupled thereto. Magnetically compliant poles (106, 107, 108, 109) are mechanically coupled to one of the spherical structure (102) and the housing (104), and a magnetic drive mechanism (114) is mechanicanically coupled to the other one of the spherical structure (102) and the housing (104) for magnetically imparting up to substantially 360 degrees of rotational motion between the spherical structure (102) and the housing (104) in multiple axes by magnetically interacting with the magnetically compliant poles (106, 107, 108, 109). Optionally, at least one of the spherical structure (102) and the housing (104) couples the rotational motion to another object (1906) mechanically coupled thereto via surface coupling.

20 Claims, 12 Drawing Sheets

METHOD AND APPARATUS FOR MULTI-AXIS ROTATIONAL MOTION

FIELD OF THE INVENTION

This invention relates generally to multi-axis rotational motion, and more particularly to a method and apparatus for stepper motor multi-axis rotational motion.

BACKGROUND OF THE INVENTION

Conventional robotic applications impart multi-axis rotational motion to a robotic end-effector by using multiple separate independent drive mechanisms. Typically, three servo motors represent three independent joints for a robotic arm. Usually, each servo motor independently can provide approximately 270° (degrees) of rotation about a single axis, which constitutes a portion of the total rotational motion imparted on the robotic end-effector. A combination of an X-axis motor, a Y-axis motor, and a Z-axis motor can impart a three dimensional motion to the robotic end-effector.

In an alternative application, there are known frictional drive mechanisms that can move a spherical joint. These frictional drive mechanisms typically comprise multiple wheels movably coupled, e.g., via surface friction, to a spherical joint to impart multi-axis rotational motion to the spherical joint. Each wheel typically rotates about an independent axis, and the combination of wheels, or frictional drive mechanisms, can impart multi-axis rotational motion to the spherical joint.

Both of these alternatives require separate multiple independent drive motors to accomplish the multi-axis rotational motion. In the first case, three independent servo motors accomplish the multi-axis rotational motion at the robotic end-effector. In the latter case, two or three independent motors may drive the wheels to frictionally impart the multi-axis rotational motion to the spherical joint.

Thus, what is necessary is a simpler method and apparatus for imparting multi-axis rotational motion.

SUMMARY OF THE INVENTION

In carrying out one form of this invention, there is provided an apparatus for multi-axis rotational motion, comprising a spherical structure, a housing at least partially enclosing the spherical structure and movably coupled thereto, a plurality of magnetically compliant poles mechanically coupled to one of the spherical structure and the housing, and magnetic drive means mechanically coupled to the other one of the spherical structure and the housing for magnetically imparting up to substantially 360 degrees of rotational motion between the spherical structure and the housing in multiple axes by magnetically interacting with the plurality of magnetically compliant poles.

In an aspect of the present invention, at least one of the spherical structure and the housing couples the rotational motion to another object mechanically coupled thereto via surface coupling.

DESCRIPTION OF A PREFERRED EMBODIMENT

Figure 1:
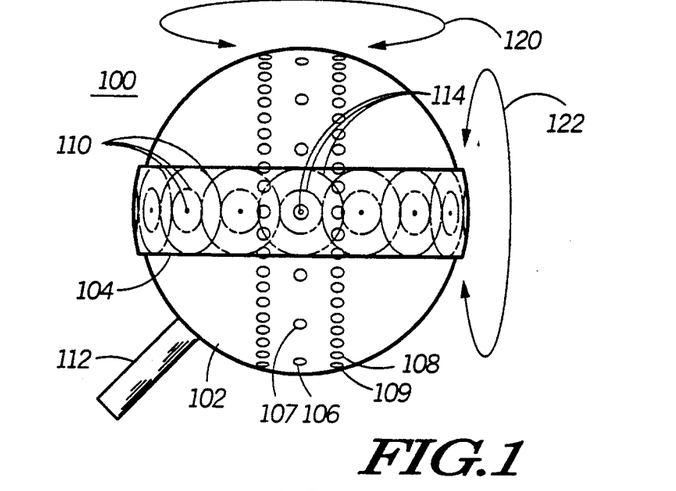
FIGS. 1, 2, and 3 show a spherical motor in rotational motion according to a preferred embodiment of the present invention.
Figure 2:
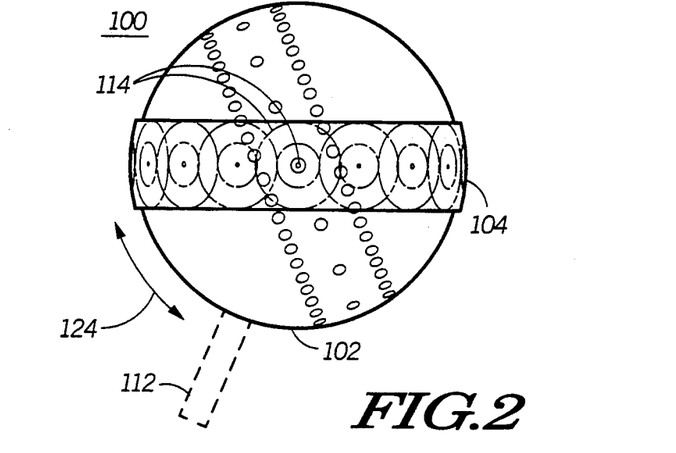
Figure 3:
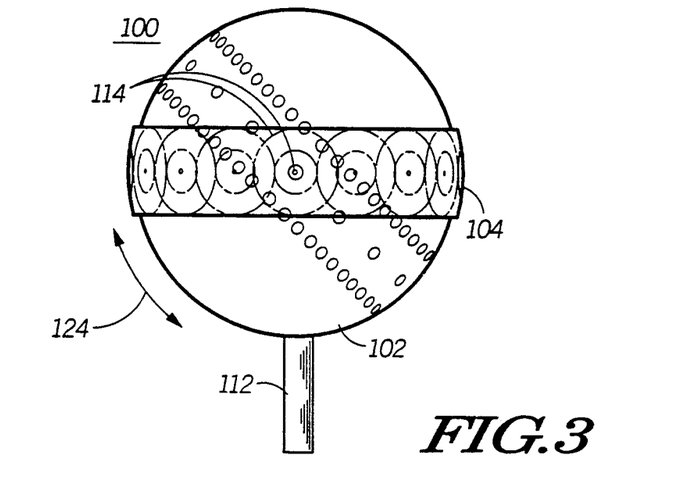

FIGS. 1, 2, and 3 show a spherical motor 100 in rotational motion according to a preferred embodiment of the present invention. Referring to FIG. 1, a spherical structure 102 is rotatable about a housing 104. The housing 104 at least partially encloses the spherical structure 102, and preferably is generally shaped like a band encircling the spherical structure 102.

Preferably, a plurality of magnetically compliant poles 106, 107, 108, 109, are mechanically coupled to the spherical structure 102. In a first alternative construction, the magnetically compliant poles 106, 107, 108, 109, may comprise ferrous rods extending radially outward from the center of the spherical structure 102. In a second alternative construction, the magnetically compliant poles 106, 107, 108, 109, may comprise ferrous plugs supported about a non-magnetically compliant surface of the spherical structure 102. In a third alternative, the magnetically compliant poles 106, 107, 108, 109, may be formed on an outer surface of a spherical structure 102, preferably using known metallurgical methods and techniques. In a fourth alternative, the magnetically compliant poles 106, 107, 108, 109, may be formed on an outer surface of a spherical structure 102, where the magnetically compliant poles 106, 107, 108, 109, comprise magnetic material and are constructed preferably using standard powder metallurgy techniques.

Furthermore, these magnetically compliant poles 106, 107, 108, 109, are preferably equally spaced about the spherical structure 102, and are preferably located about 1 or more latitudes of the spherical structure 102. Any number of magnetically compliant poles can be thus arranged, within the scope of the invention. For example, sixteen magnetically compliant poles 106, 107, can be equally spaced about the spherical structure 102. These magnetically compliant poles 106, 107 substantially encircle the spherical structure 102 and are spaced at approximately 22.5° (degrees) increments about the spherical structure 102. Further, on either side of the 22.5° spaced magnetically compliant poles 106, 107, are located a series of equally spaced magnetically compliant poles 108, 109, that also substantially encircle the spherical structure 102. These magnetically compliant poles 108, 109, are equally spaced at approximately 7.5° increments about the spherical structure 102. The 7.5° spaced magnetically compliant poles 108, 109, on either side of the 22.5° spaced magnetically compliant poles 106, 107, are arranged such that a horizontal latitude about the spherical structure 102 would intersect a 22.5° spaced magnetically compliant pole with a 7.5° spaced magnetically compliant pole on either side. This pattern would repeat every third 7.5° magnetically compliant pole.

The housing 104 comprises magnetic drive means 110, 114, mechanically coupled to the housing 104. The magnetic drive means 110, 114, preferably comprises a plurality of magnetic drive poles 110, 114, arranged in substantially elliptical pattern about the spherical structure 102. Any number of groups of magnetic drive poles can be thus arranged, within the scope of the invention. In this example, 16 groups of magnetic drive poles 110, 114, are arranged in substantially elliptical pattern. The magnetic drive poles arranged in this fashion can be individually selectively energized, or energized in combination, for magnetically interacting with the plurality of magnetically compliant poles 106, 107, 108, 109, for imparting rotational motion between the spherical structure 102 and the housing 104, as will be more fully discussed below.

Figure 19:
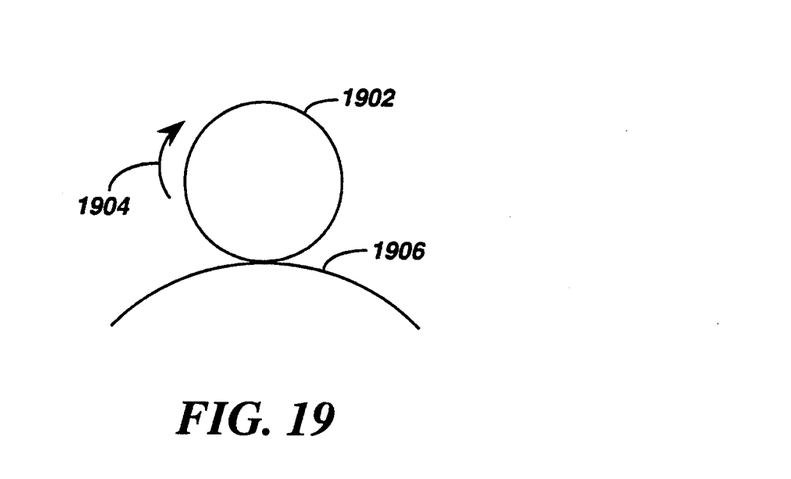
FIG. 19 is a plan view illustrating a spherical motor in a surface coupling arrangement with a surface of an object, according to the preferred embodiment of the present invention.
Figure 20:
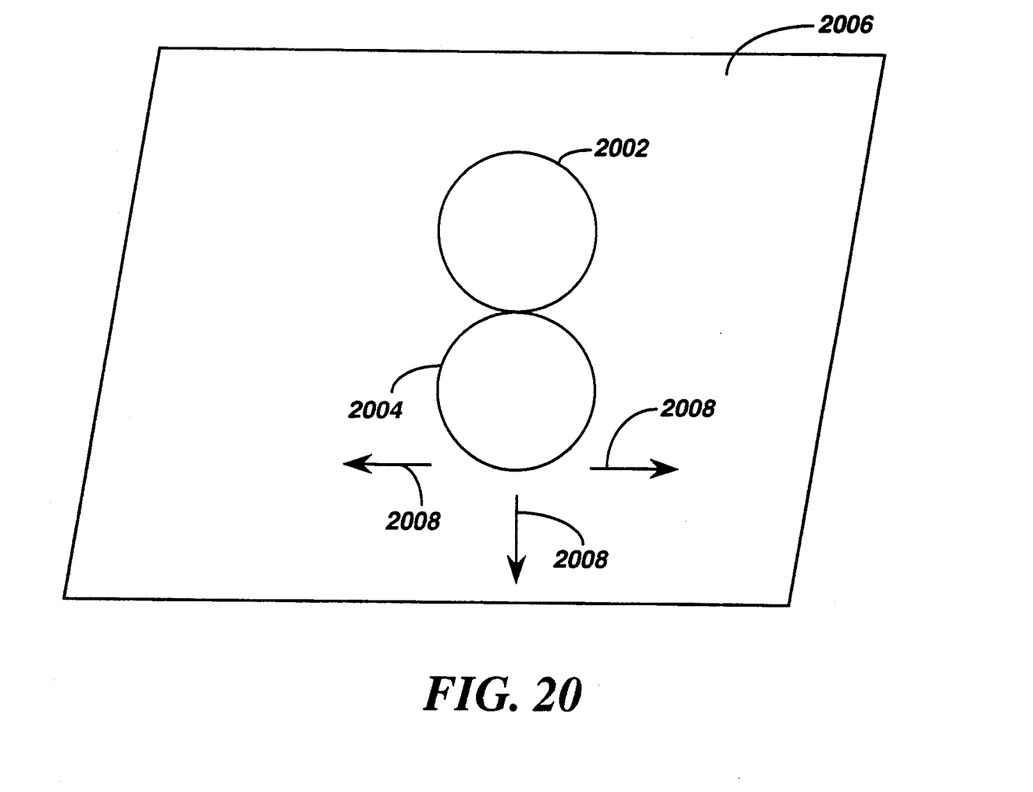
FIG. 20 is a plan view illustrating a spherical motor in a surface coupling arrangement with a surface of a spherical object to deliver rotational motion thereby to another object, according to the preferred embodiment of the present invention.

The rotational motion generated between the spherical structure 102 and the housing 104 may be coupled to another object via coupling rod 112. The rod 112 is mechanically coupled to the spherical structure 102, and can mechanically couple the rotational motion directly from the spherical structure 102 to a robotic end-effector (not shown). Alternatively, the spherical structure 102 can freely rotate relative to the housing 104 about multiple axes 120, 122, 124, without being constrained by a coupling rod 112 and the housing 104. Exemplary illustrations of this alternative arrangement are shown in FIGS. 19 and 20, and are more fully discussed below.

The magnetic drive means 110, 114, mechanically coupled to the housing 104 is capable of imparting rotational motion between the spherical structure 102 and the housing 104 about a horizontal axis 120, or a vertical axis 122. Further, as illustrated in FIGS. 2 and 3, the magnetic drive means 114 can impart a Z-axis rotation 124 between the spherical structure 102 and the housing 104. As shown in FIGS. 2 and 3, the spherical structure 102 has rotated 45° about the Z-axis rotation 124 in 22.5° increments. A preferred method and apparatus for this rotational motion will be more fully discussed below.

Figure 4:
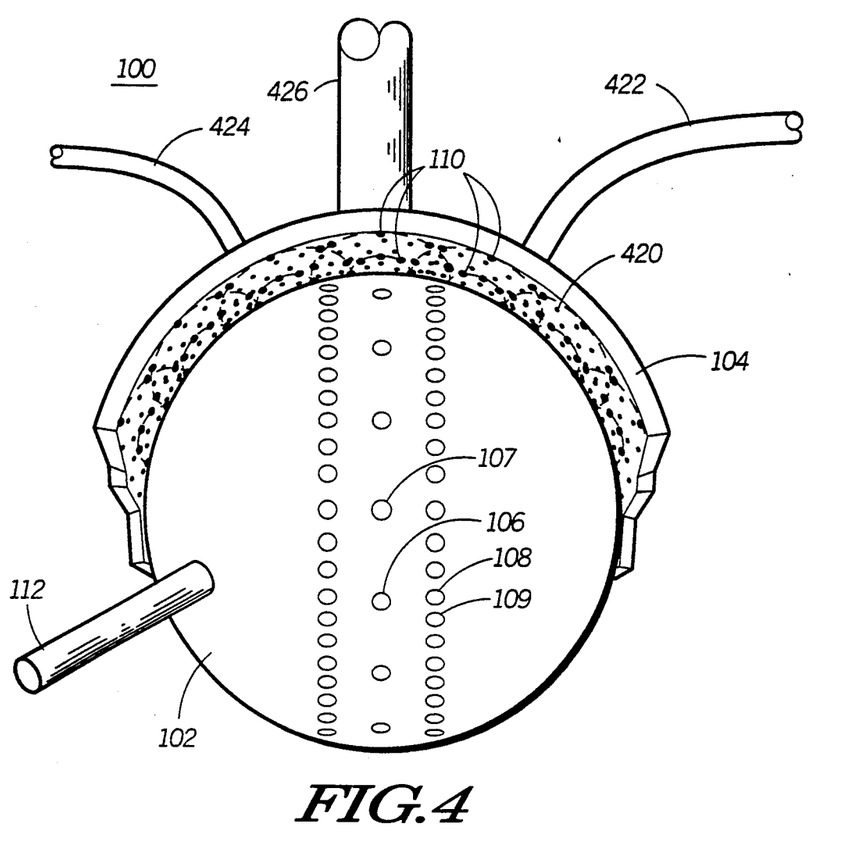
FIG. 4 illustrates a perspective view of the spherical motor with the housing being cut away, according to the preferred embodiment of the present invention.

FIG. 4 illustrates a perspective view of the spherical motor 100 with the housing 104 being cut away to reveal the magnetic drive poles 110 coupled to the housing 104, according to the preferred embodiment of the present invention. Further, a plurality of holes 420 feed continuous pneumatic pressure for providing a pneumatic bearing between the spherical structure 102 and the housing 104. Preferably, the pneumatic bearing is an air bearing that mechanically couples the housing 104 and the spherical structure 102. An air nozzle 422 provides air from an air pump (not shown) to the plurality of air holes 420 in the housing 104. Of course, another type of gas may be used in the place of air to provide a pneumatic bearing between the spherical structure 102 and the housing 104.

An electrical harness 424 couples the electrical signals from a controller (not shown) to the plurality of magnetic drive poles 110 coupled to the housing 104. Also, a support structure 426 is mechanically coupled to the housing 104 to support the housing 104 while allowing the spherical structure 102 to rotate relative thereto.

Figure 5:
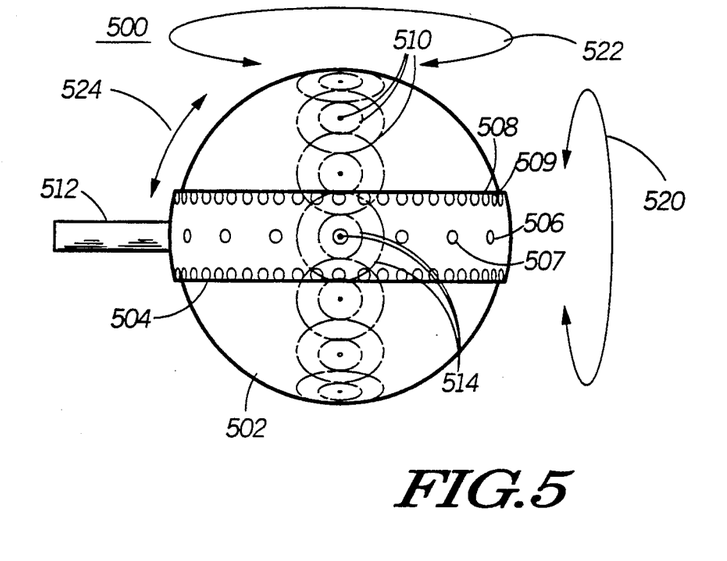
FIG. 5 shows an alternative embodiment of a spherical motor, according to the present invention.

FIG. 5 shows an alternative embodiment of a spherical motor 500, according to the present invention. In this alternative, the plurality of magnetically compliant poles 506, 507, 508, 509, are mechanically coupled to the housing 504, and the magnetic drive poles 510, 514, are mechanically coupled to the spherical structure 502. In this arrangement, the housing 504 can rotate relative to the spherical structure 502. An exemplary coupling rod 512 can couple the rotational motion from the housing 504 to another object, such as a robotic end-effector. Similar to the previous discussion, the housing 504 can rotate relative to the spherical structure 502 in a vertical axis 520, a horizontal axis 522, or a Z-axis rotation 524. Hence, the rotation coupled to another object, such as by coupling rod 512, may be imparted from a moving housing 504, as shown in FIG. 5, or from a moving spherical structure 102, as shown in FIGS. 1, 2, and 3.

Optionally, a hydraulic bearing may be used in place of the pneumatic bearing. Alternatively, ball bearings, sleeve bearings, or a sliding bearing mechanism, may be used between the spherical structure 102 and the housing 104, using known mechanical methods and techniques. From the above it can be seen that at least one bearing mechanism may be coupled between the housing 104 and the spherical structure 102 to facilitate the rotational motion between the spherical structure 102 and the housing 104.

Figure 6:
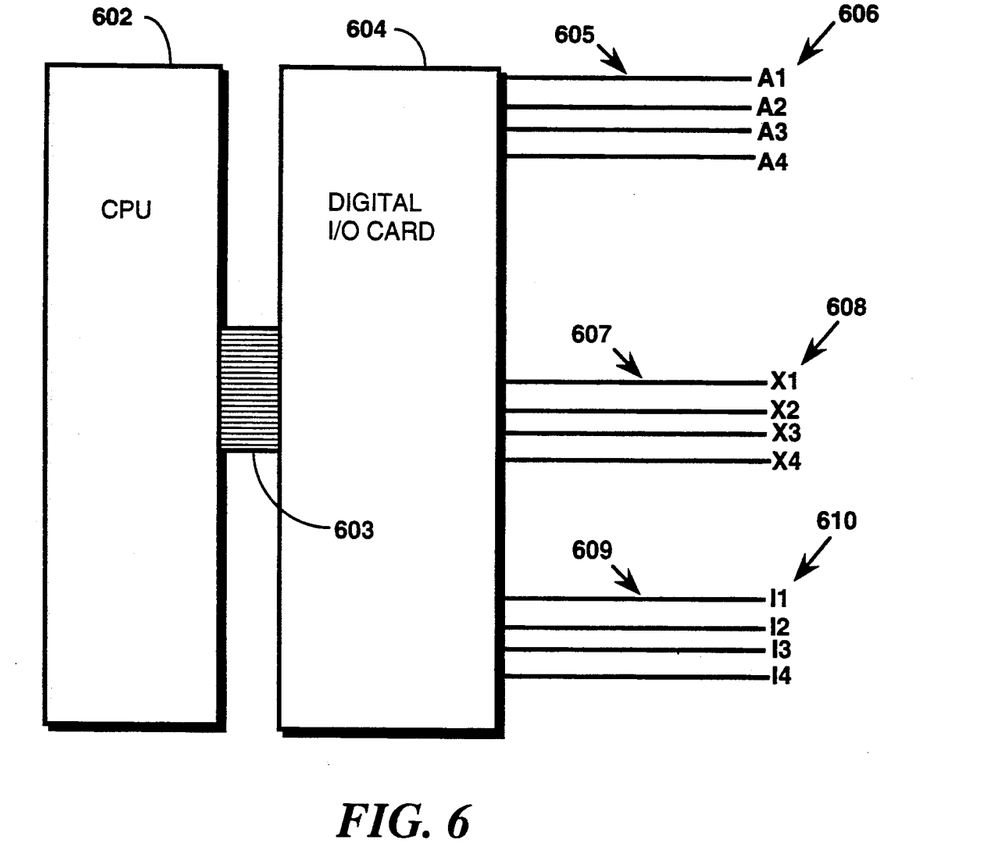
FIG. 6 shows an electrical block diagram of a controller for a spherical motor, in accordance with the preferred embodiment of the present invention.

FIG. 6 shows an electrical block diagram of a controller 602 for a spherical motor, in accordance with the preferred embodiment of the present invention. The controller 602 is electrically coupled to a digital input/output card 604 via an electrical harness 603. The digital input/output card 604 selectively couples control pulses from the controller 602 to either single magnetic drive poles (e.g., labeled A1 to A4, X1 to X4, and I1 to I4), or groups of magnetic drive poles 606, 608, 610, via electrical cabling 605, 607, 609, respectively. The magnetic drive poles 606, 608, 610, may comprise magnetic cores having sufficient coil windings to provide electromagnets, using known electrical methods and techniques.

The magnetic drive poles 606, 608, 610, typically are electrically coupled to a positive voltage potential on one side of their respective electrical circuits. Further, the magnetic drive poles 606, 608, 610, either singly or in groups, can be selectively pulled down to a negative voltage potential on the other side of their respective electrical circuits via the digital input/output card 604 and the electrical cabling 605, 607, 609, for the respective magnetic drive poles 606, 608, 610. In this way, the controller 602 can control the magnetic drive poles 606, 608, 610, either singly or in groups, by coupling electrical pulses thereto.

The electrical pulses alternately energize and de-energize the respective magnetic drive poles 606, 608, 610, for magnetically imparting rotational motion between the spherical structure 102 (FIG. 1) and the housing 104. Preferably, the energized magnetic drive poles 606, 608, 610, generate a magnetic force that can attract the magnetically compliant poles 106, 107, 108, 109, (FIG. 1) about the spherical structure 102. Other arrangements for the magnetically compliant poles 106, 107, 108, 109, and the magnetic drive poles 606, 608, 610, are possible within the scope of the invention. For example, the magnetically compliant poles 106, 107, 108, 109, can comprise fixed magnets of predetermined polarity, e.g. north or south poles.

Further, the magnetic drive poles 606, 608, 610, can be pulsed to selectively generate magnetic force, in either the north or south polarity, to impart attracting force or repelling force relative to the magnetically compliant poles 106, 107, 108, 109. The alternative polarities can be accomplished such as by selectively pulling up (to a higher voltage potential) or down (to a lower voltage potential) the other side of the respective electrical circuits for the magnetic drive poles 606, 608, 610. The coil windings of the magnetic drive poles 606, 608, 610, in combination with the polarity of the resulting current running therethrough, can selectively generate magnetic force in alternative polarity, e.g., north or south polarity. Hence, by selectively energizing the magnetic drive poles 606, 608, 610, either singly or in groups, to generate attracting or repelling force to the magnetically compliant poles 106, 107, 108, 109, the controller 602 can control the magnetic force applied to the magnetically compliant poles 106, 107, 108, 109, for magnetically imparting rotational motion between the spherical structure 102 and the housing 104.

Figure 7:
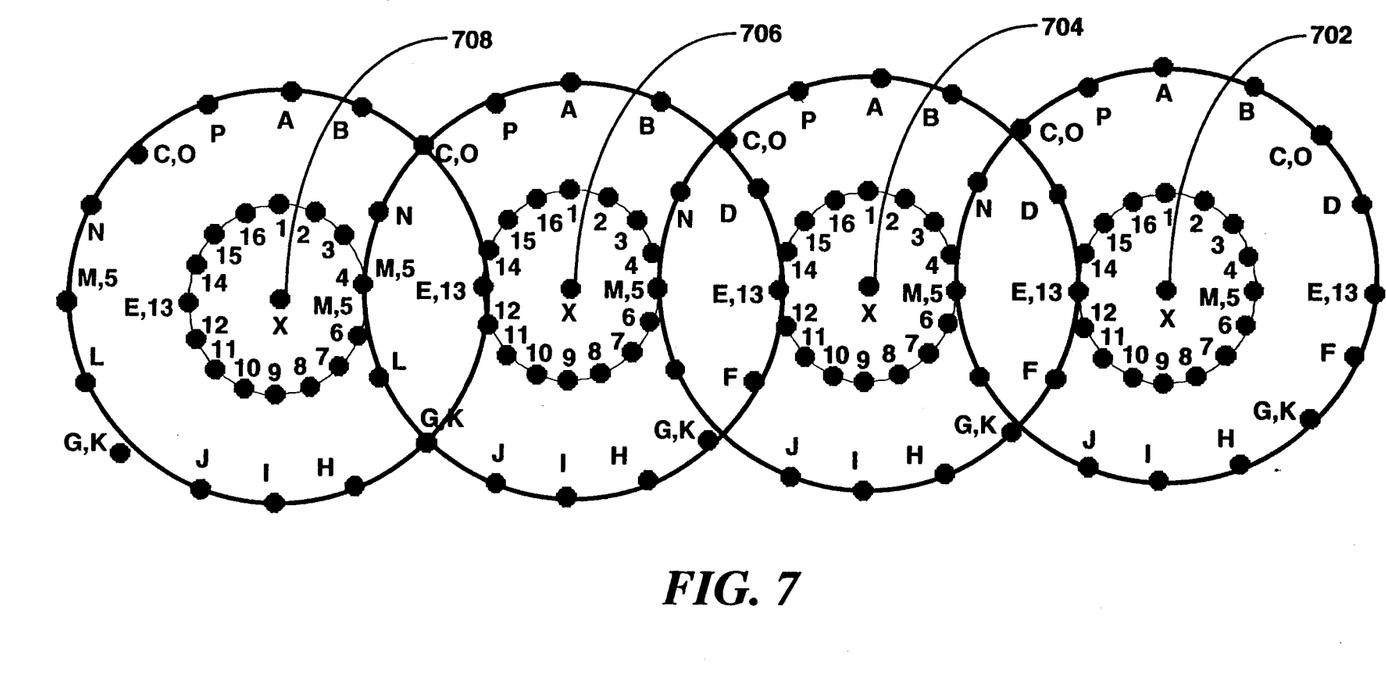
FIG. 7 illustrates groups of magnetic drive poles arranged in substantially elliptical patterns, according to the preferred embodiment of the present invention.

FIG. 7 illustrates groups of magnetic drive poles arranged in substantially elliptical patterns 702, 704, 706, 708, according to the preferred embodiment of the present invention. For this demonstration of an operational sequence for multi-axis rotational motion, the dimensions of the substantially elliptical patterns 702, 704, 706, 708, are selected to form substantially circular patterns 702, 704, 706, 708, as shown. In alternative constructions, the dimensions may vary to alter the rotational path followed between the spherical structure 102 and the housing 104 relative to one or more axes of rotation.

Furthermore, sixteen groups of magnetic drive poles arranged in substantially elliptical patterns can be mechanically coupled to the housing 104 (FIG. 1). These sixteen groups are organized in four groups of four substantially elliptical patterns 702, 704, 706, 708, as shown in FIG. 7. Each substantially elliptical pattern 702 comprises magnetic drive poles arranged in an outer elliptical pattern (as indicated by the letters A to P), an inner elliptical pattern (as indicated by the numbers 1 to 16), and a center magnetic drive pole (as indicated by the letter X).

The substantially elliptical patterns 702, 704, 706, 708, partially overlap each other as shown. Further, magnetic drive poles that are radially collinear with each other from the center magnetic drive pole are equally spaced apart. For example, the distance between the center magnetic drive pole labeled X and the inner magnetic drive pole labeled 5 is equal to the distance between the inner magnetic drive pole labeled 5 and the outer magnetic drive pole labeled E. Similarly, the distance between the center magnetic drive pole X and the inner magnetic drive pole 1 is equal to the distance between the inner magnetic drive pole 1 and the outer magnetic drive pole A.

Figure 8:
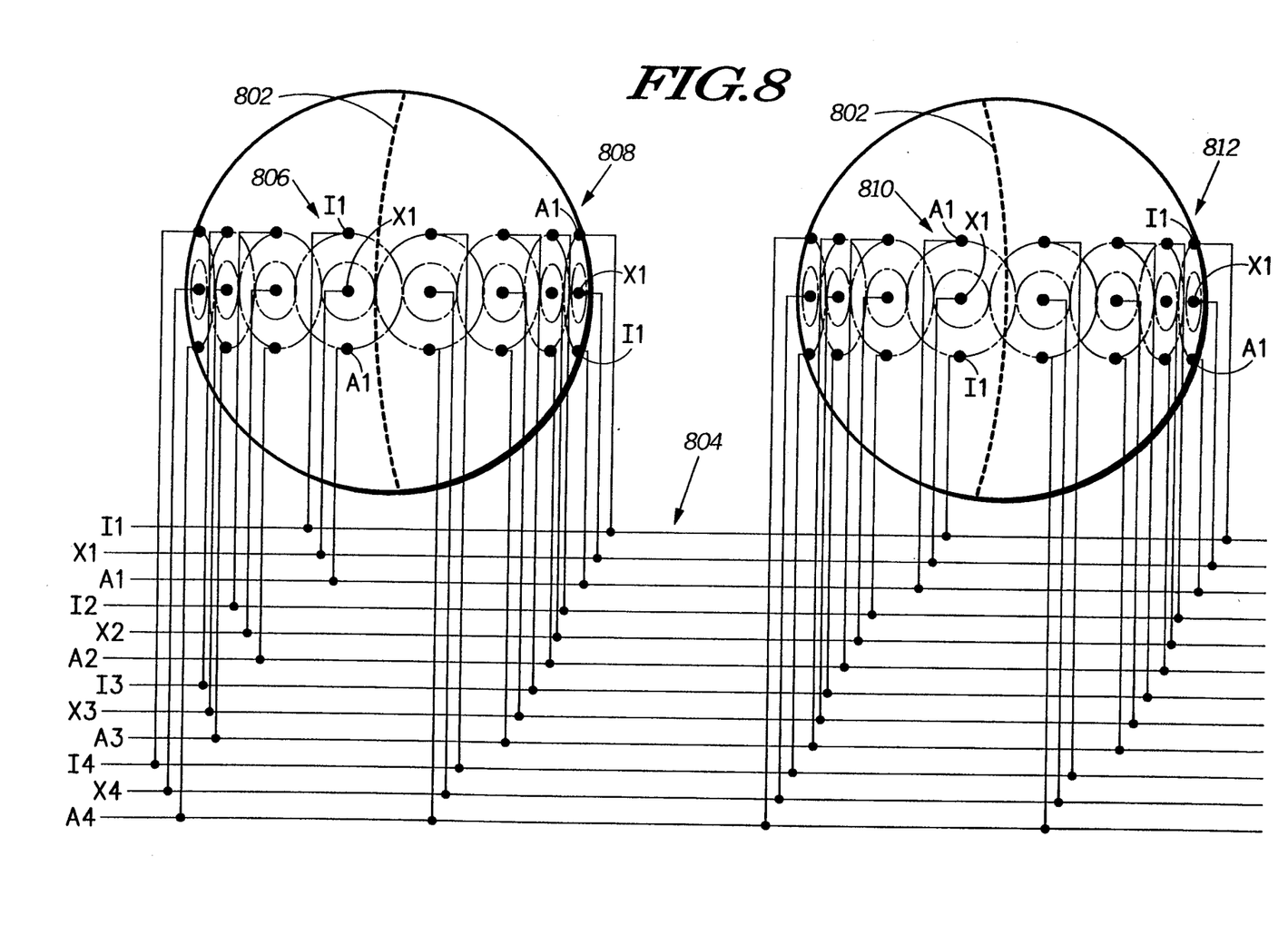
FIG. 8 shows a partial wiring matrix for the groups of magnetic drive poles arranged in substantially elliptical patterns as shown in FIG. 7, according to the preferred embodiment of the present invention.

Additionally, two groups of four substantially elliptical patterns are arranged about each opposing hemisphere of the spherical structure 102. The two groups of four substantially elliptical patterns 702, 704, 706, 708, are preferably wired together such that magnetic drive poles arranged in similar orientation about their respective substantially elliptical pattern are energized and de-energized with each other. That is, every fourth substantially elliptical pattern arranged about the same hemisphere are energized and de-energized with each other in similar orientation. On the other hand, substantially elliptical patterns that are located about opposing hemispheres are energized and de-energized in opposing orientation between each other, respectively. This wiring arrangement is partially illustrated with the wiring matrix 804 in FIG. 8. The wiring matrix 804 interconnects the magnetic drive poles labeled I, X, and A, for the four groups of the substantially elliptical patterns arranged about the two opposing hemispheres 802 of the spherical structure 102. As can be seen, the first substantially elliptical pattern 806 is interconnected in similar orientation with the fourth substantially elliptical pattern 812, both residing on the same hemisphere with each other. This is likewise true for the second substantially elliptical pattern 808 and the third substantially elliptical pattern 810. Also, the substantially elliptical patterns located about opposing hemispheres 802 are interconnected in opposing orientation between each other. Hence, the substantially elliptical patterns 806, 810, that are located about opposing hemispheres 802 of the spherical structure 102 have magnetic drive poles that are arranged in opposing orientation and are energized and de-energized with each other. For example, the magnetic drive pole labeled I in the first substantially elliptical pattern 806 is arranged in opposing orientation relative to the magnetic drive pole labeled I in the third group of substantially elliptical patterns 810. In similar fashion, the second group of substantially elliptical patterns 808 is wired in opposing orientation relative to the fourth group of substantially elliptical patterns 812. In this way, the same control line in the wire matrix 804 can control four magnetic drive poles, one from each group of four substantially elliptical patterns 806, 808, 810, 812. Further, magnetic drive poles located on the same hemisphere 802 are wired together in the same orientation, such as the magnetic drive poles labeled A1 in the second group of substantially elliptical patterns 808 and a third group of substantially elliptical patterns 810. Furthermore, the magnetic drive poles that are located about opposing hemispheres 802 are wired in opposing orientation to each other, such as the magnetic drive poles labeled I1 in the first group of substantially elliptical patterns 806 and the third group of substantially elliptical patterns 810. This arrangement provides a mechanism for imparting rotational motion between the spherical structure 102 and the housing 104, as will be more fully discussed below.

Figure 9:
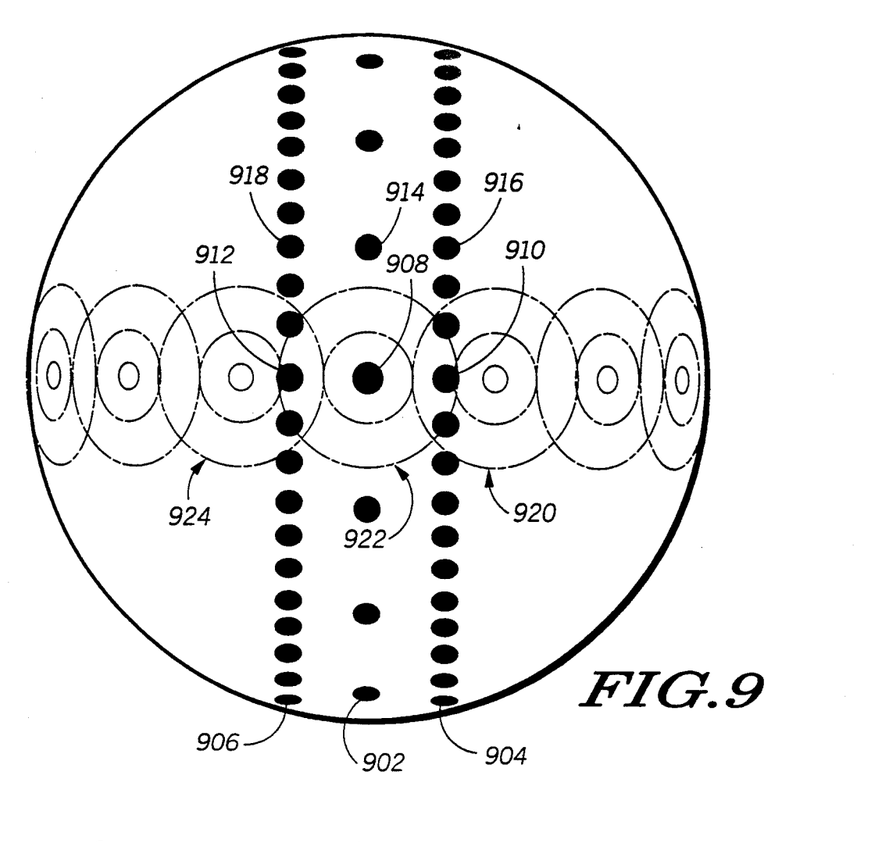
FIG. 9 illustrates magnetically compliant poles and magnetic drive poles arranged in accordance with the preferred embodiment of the present invention.
Figure 10:
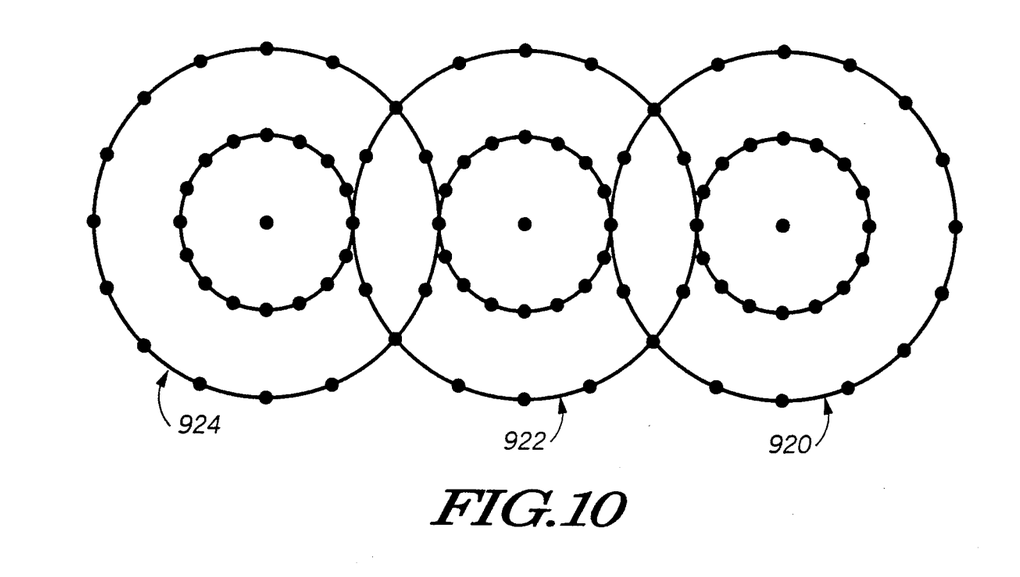
FIG. 10 shows a more detailed view of the magnetic drive poles arranged in several of the substantially elliptical patterns of FIG. 9, according to the preferred embodiment of the present invention.

FIG. 9 illustrates magnetically compliant poles 902, 904, 906, 908, 910, 912, 914, 916, 918, and magnetic drive poles arranged in substantially elliptical patterns 920, 922, 924, in accordance with the preferred embodiment of the present invention. The magnetically compliant poles 902, 904, 906, 908, 910, 912, 914, 916, 918, are mechanically coupled to the spherical structure 102 (FIG. 1), and the magnetic drive poles arranged in substantially elliptical patterns 920, 922, 924, are mechanically coupled to the housing 104. Further, FIG. 10 shows a more detailed view of the magnetic drive poles arranged in several of the substantially elliptical patterns 920, 922, 924. This arrangement will be referred to in illustrating how the magnetic drive poles can interact with the magnetically compliant poles to impart rotational motion between the spherical structure 102 and the housing 104.

Figure 11:
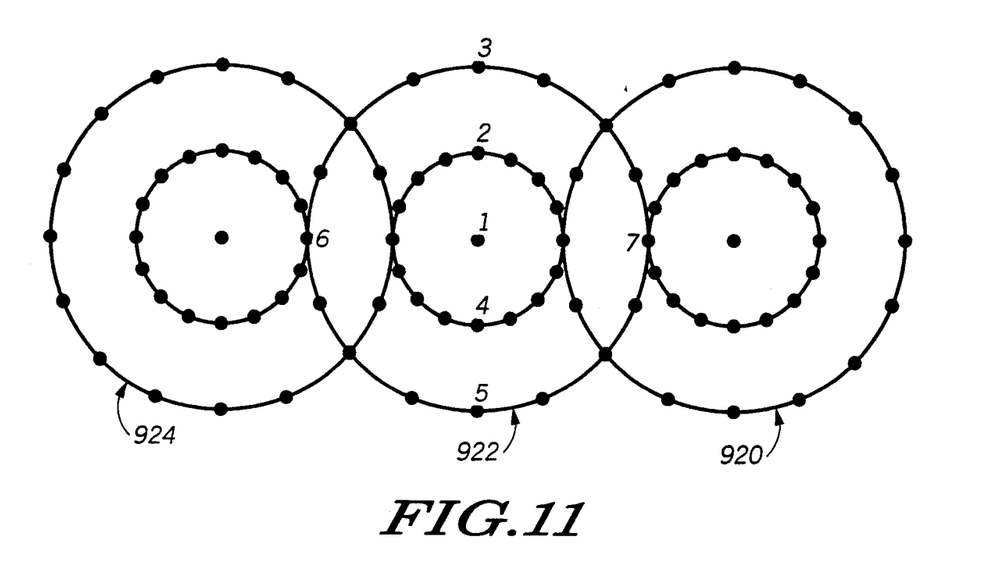
FIG. 11 identifies a number of the magnetic drive poles arranged in several of the substantially elliptical patterns of FIG. 10, for illustrating movement of the magnetically compliant poles with the timing diagram of FIG. 12.
Figure 12:
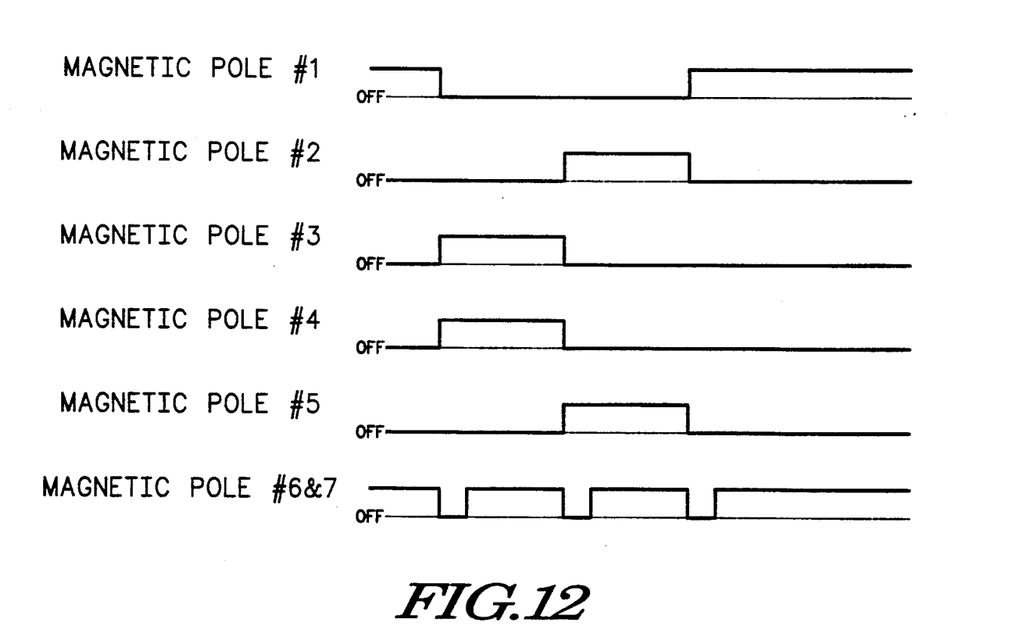
FIG. 12 is a timing diagram illustrating movement of the magnetically compliant poles relative to the magnetic drive poles of FIG. 9 about a first axis, according to the preferred embodiment of the present invention.

FIG. 12 is a timing diagram illustrating movement of the magnetically compliant poles 902, 904, 906, 908, 910, 912, 914, 916, 918, (FIG. 9), relative to the magnetic drive poles arranged in several of the substantially elliptical patterns 920, 922, 924 about a first axis, according to the preferred embodiment of the present invention. For illustrative purposes, FIG. 11 identifies a number of the magnetic drive poles arranged in several of the substantially elliptical patterns. For this illustration, seven magnetic drive poles labeled 1 to 7 in the central substantially elliptical pattern 922 can be energized and de-energized following a pulse timing sequence to impart a vertical movement between the spherical structure 102 and the housing 104. It is understood that the substantially elliptical pattern 922 has a counterpart substantially elliptical pattern located about the opposing hemisphere, and wired in opposing orientation.

Initially, magnetic drive poles 1, 6, and 7 are energized and are attracting magnetically compliant poles 908, 912 and 910, respectively. This is the locking position, where the spherical structure 102 and the housing 104 are held in constant relative position. When the magnetic drive poles labeled 1, 6, and 7 are de-energized, the magnetic drive poles labeled 3 and 4 are subsequently energized to attract the magnetically compliant poles 914 and 908, respectively.

Because the magnetic drive poles located about opposing hemispheres are energized in opposing orientation, the combination of magnetic drive poles about opposing hemispheres imparts a rotational motion between the spherical structure 102 and the housing 104 along a first axis. Immediately after the magnetic drive poles labeled 3 and 4 are energized, the magnetic drive poles 6 and 7 are also energized in the locking position. This holds the spherical structure 102 in a constant position relative to the housing 104.

Next, the magnetic drive poles labeled 2 and 5 are energized with the magnetic drive poles labeled 3, 4, 6, and 7 being de-energized. Hence, magnetic drive poles 2 and 5 attract the magnetically compliant poles 914 and 908, respectively. This again imparts additional rotational motion about the first axis. In this example, the step increments are 7.5° each. Immediately after the magnetic drive poles 2 and 5 are energized, the magnetic drive poles 6 and 7 are energized in the locking position.

Finally, to complete the 22.5° step increment, the magnetic drive poles labeled 2, 5, 6, and 7 are de-energized and the magnetic drive pole labeled 1 is energized. This attracts the magnetically compliant pole 914, and thereby completes the 22.5° rotational motion about the first axis. Immediately thereafter the magnetic drive poles labeled 6 and 7 are energized in the locking position. Therefore, as illustrated here, a sequence of timed pulses can be applied to the magnetic drive poles to control and impart a rotational motion between the spherical structure 102 and the housing 104 about a first axis.

Figure 13:
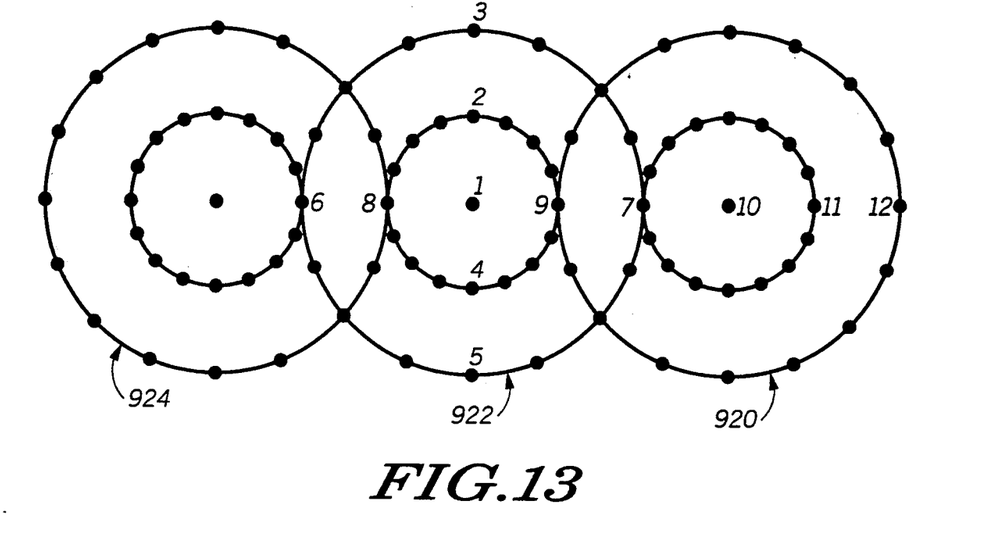
FIG. 13 identifies a number of the magnetic drive poles arranged in several of the substantially elliptical patterns of FIG. 10, for illustrating movement of the magnetically compliant poles with the timing diagram of FIG. 14.
Figure 14:
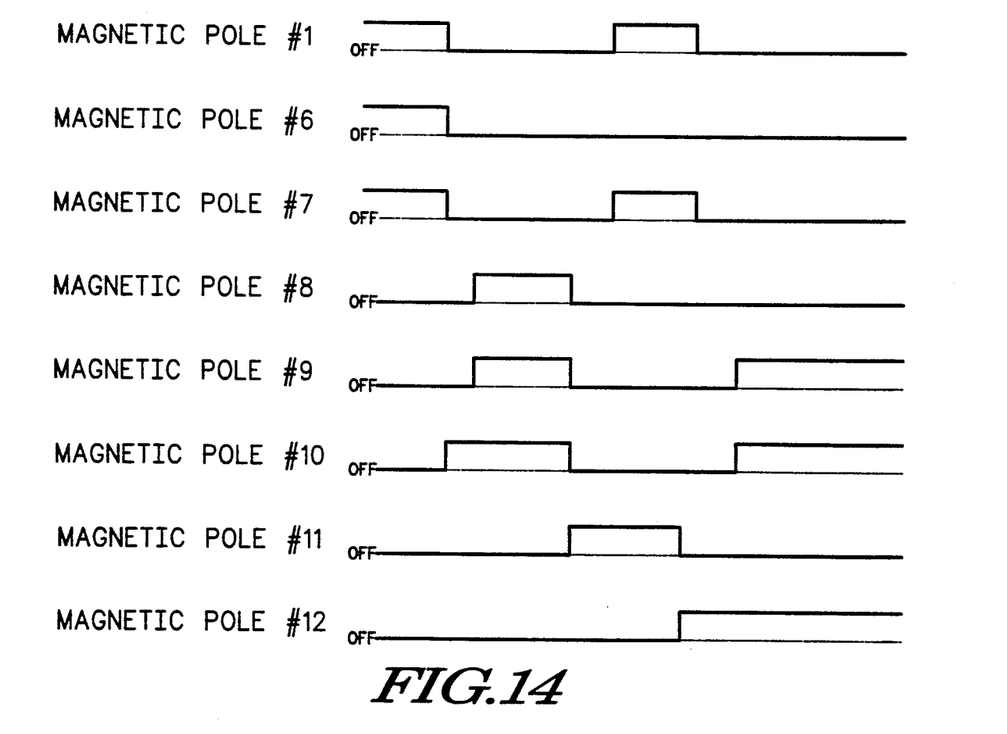
FIG. 14 is a timing diagram illustrating movement of the magnetically compliant poles relative to the magnetic drive poles of FIG. 9 about a second axis, according to the preferred embodiment of the present invention.

FIG. 14 is a timing diagram illustrating movement of the magnetically compliant poles 902, 904, 906, 908, 910, 912, 914, 916, 918, (FIG. 9), relative to the magnetic drive poles arranged in several of the substantially elliptical patterns 920, 922, 924 about a second axis, according to the preferred embodiment of the present invention. For illustrative purposes, FIG. 13 identifies a number of the magnetic drive poles arranged in several of the substantially elliptical patterns. The magnetic drive poles labeled 1 to 12 in the substantially elliptical patterns 920, 922, and 924 are used to impart a horizontal rotational motion between the spherical structure 102 and the housing 104. Initially, magnetic drive poles 1, 6, and 7 are energized in the locking position, attracting the magnetically compliant poles 908, 912, 910, respectively (FIG. 9). After de-energizing the magnetic drive poles 1, 6, and 7, the magnetic drive pole labeled 10 is energized followed by the magnetic drive poles labeled 9 and 8. This energizing sequence attracts the magnetically compliant poles 910, 908, and 912, respectively. About the opposing hemisphere of the spherical structure 102 are energized the corresponding magnetic drive poles which are in opposing orientation, consequently imparting a rotational motion between the spherical structure 102 and the housing 104 about a second axis (horizontal axis). The step increment is 7.5°.

Next, the magnetic drive poles 8, 9, and 10 are de-energized, and magnetic drive poles 11 followed by 7 and 1 are sequentially energized to attract the magnetically compliant poles 910, 908, and 912, respectively, for another 7.5° increment. Finally, after the magnetic drive poles 1, 7, and 11 are de-energized, the magnetic drive poles 12 followed by 10 and 9 are sequentially energized to impart an additional 7.5° rotational motion about the horizontal axis. The energized magnetic drive poles 9, 10, and 12 are in the locking position. Therefore, a 22.5° step increment has been imparted between the spherical structure 102 and the housing 104 along the second axis.

Figure 15:
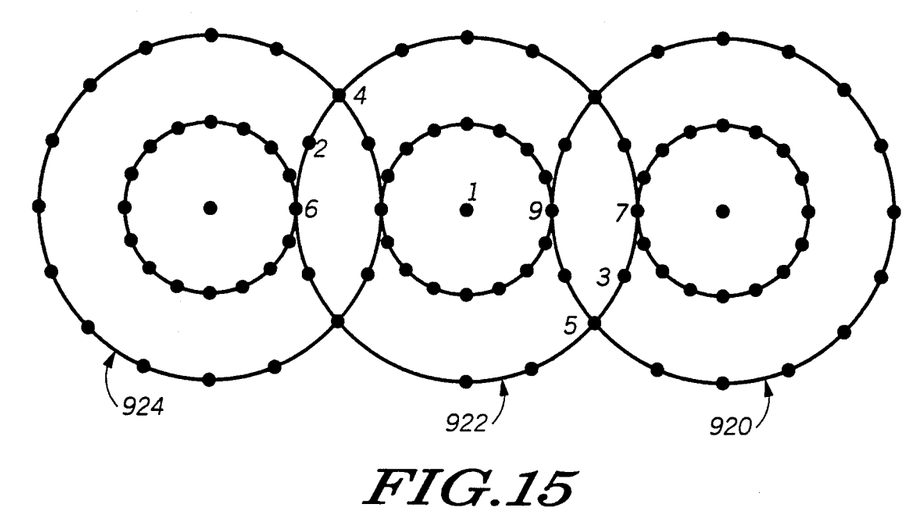
FIG. 15 identifies a number of the magnetic drive poles arranged in several of the substantially elliptical patterns of FIG. 10, for illustrating movement of the magnetically compliant poles with the timing diagram of FIG. 16.
Figure 16:
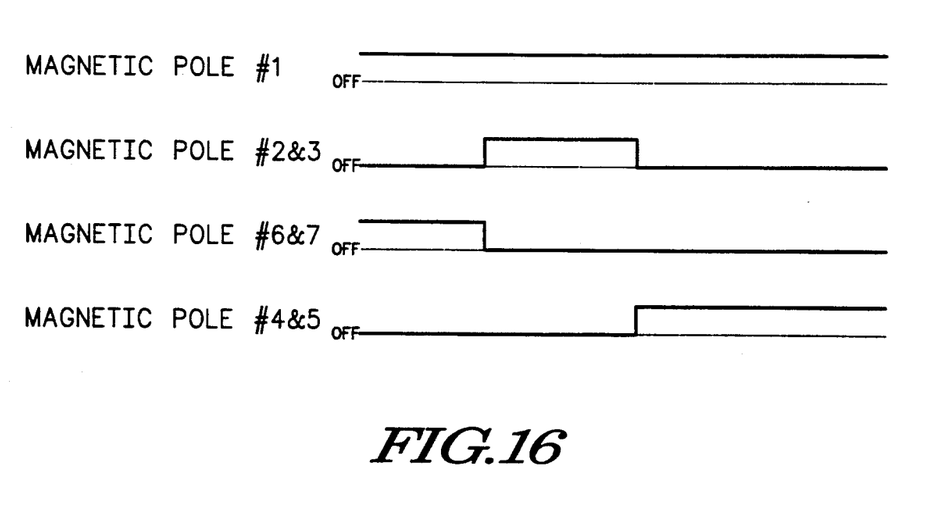
FIG. 16 is a timing diagram illustrating movement of the magnetically compliant poles relative to the magnetic drive poles of FIG. 9 about a third axis, according to the preferred embodiment of the present invention.

FIG. 16 is a timing diagram illustrating movement of the magnetically compliant poles 902, 904, 906, 908, 910, 912, 914, 916, 918, (FIG. 9), relative to the magnetic drive poles arranged in several of the substantially elliptical patterns 920, 922, 924 about a third axis (Z-axis rotation), according to the preferred embodiment of the present invention. For illustrative purposes, FIG. 15 identifies a number of the magnetic drive poles arranged in several of the substantially elliptical patterns. For a 45° Z-axis rotation, the magnetic drive poles 1 to 7 can be used. Initially, magnetic drive poles 1, 6, and 7 are energized to attract magnetically compliant poles 908, 912 and 910, respectively. While maintaining the magnetic drive pole 1 energized (on opposing hemispheres), the magnetic drive poles 6 and 7 are de-energized and the magnetic drive poles 2 and 3 are energized to impart a 22.5° rotational motion between the spherical structure 102 and the housing 104 about the third axis.

Next, the magnetic drive poles 2 and 3 are de-energized and the magnetic drive poles 4 and 5 are energized to again impart a 22.5° step increment in rotational motion about the Z-axis. This completes a 45° rotational motion between the spherical structure 102 and the housing 104. Therefore, three different rotational motions about three different axes, respectively, have been illustrated with reference to the FIGS. 12, 14, and 16.

Figure 17:
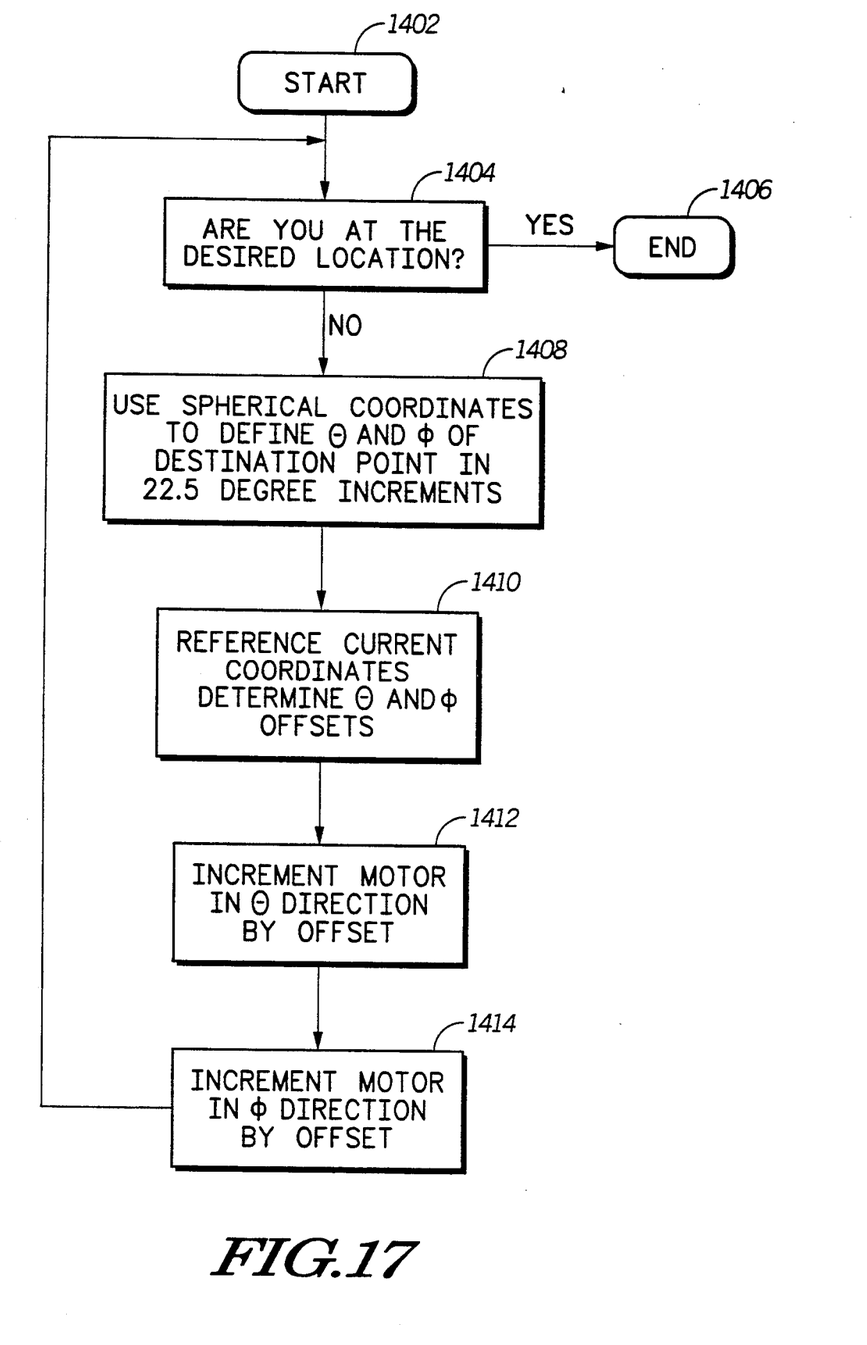
FIG. 17 is a flow diagram for a controller illustrating an operational sequence for imparting rotational motion about the first and second axes of FIGS. 12 and 14, in accordance with the preferred embodiment of the present invention.

FIG. 17 is a flow diagram for a controller 602 (FIG. 6) illustrating an operational sequence for imparting rotational motion about the first and second axes of FIGS. 12 and 14, in accordance with the preferred embodiment of the present invention. A controller 602, such as shown in FIG. 6, can control the rotational motion between the spherical structure 102 and the housing 104 in step increments of 22.5° in the horizontal axis and in the vertical axis. Once the controller 602 determines that a new spherical coordinate is desired 1402, 1404, the controller 602 defines the horizontal and vertical destination in 22.5° increments 1408. The horizontal increment is defined by the symbol $\theta$ (theta) and the vertical coordinate is defined by the symbol $\phi$ (phi). Next, the controller 602 determines the offsets in the horizontal and vertical coordinates to the desired location 1410. The controller 602 controls the magnetic drive poles as discussed for FIG. 14 to impart rotational motion between the spherical structure 102 and the housing 104 in the horizontal direction 1412. Also, the controller 602 can control the magnetic drive poles to impart rotational motion between the spherical structure 102 and the housing 104 about the vertical axis 1414, as discussed for FIG. 12. This sequence continues while the controller 602 processes new coordinates for rotation, and until a desired final location is reached 1404, 1406.

Figure 18:
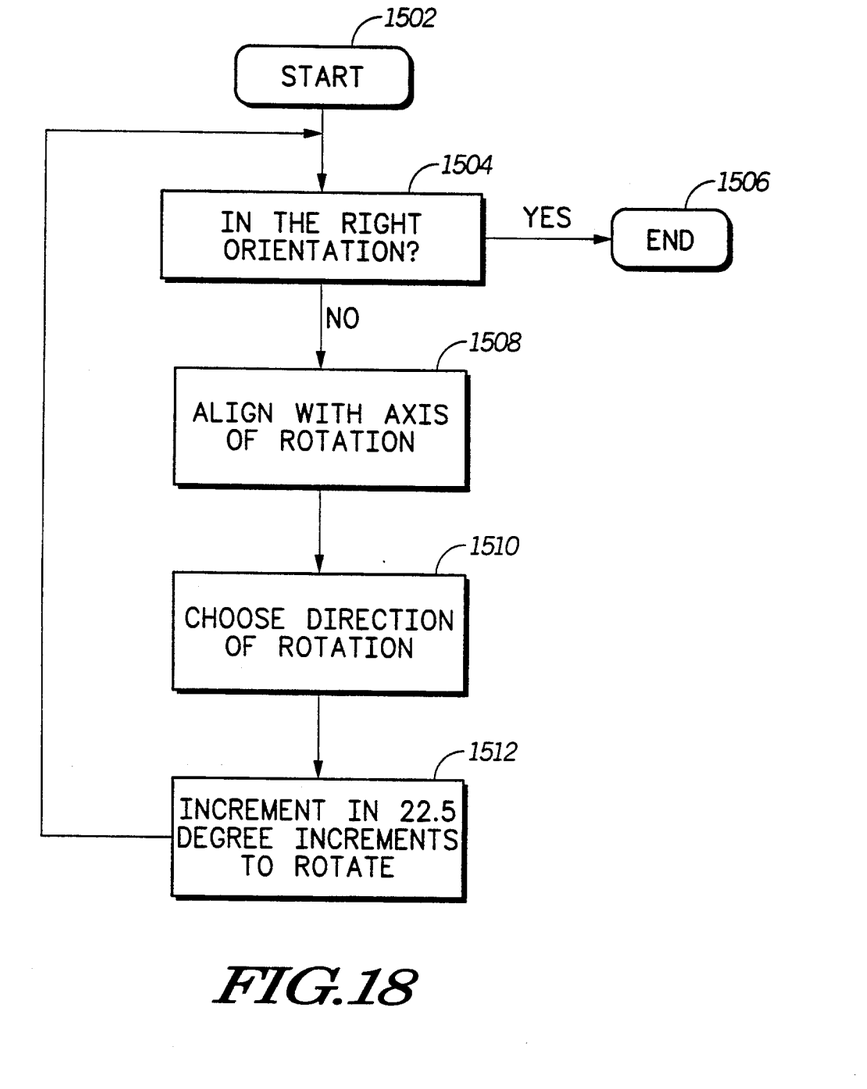
FIG. 18 is a flow diagram for a controller illustrating an operational sequence for imparting rotational motion about the third axis of FIG. 16, in accordance with the preferred embodiment of the present invention.

FIG. 18 is a flow diagram for a controller 602 (FIG. 6) illustrating an operational sequence for imparting rotational motion about the third axis of FIG. 16, in accordance with the preferred embodiment of the present invention. A controller 602, such as shown in FIG. 6, can control the magnetically compliant poles to impart a rotational motion between the spherical structure 102 and the housing 104 about the Z-axis, as illustrated in FIG. 16.

Once a new orientation between the spherical structure 102 and the housing 104 is desired 1502, 1504, the controller 602 aligns the spherical structure 102 and the housing 104 to coincide the magnetically compliant poles with the magnetic drive poles for a desired Z-axis rotation 1508. This may entail stepping rotational motion between the spherical structure 102 and the housing 104, e.g., in the vertical or horizontal axes, until the magnetically compliant poles and the magnetic drive poles for the selected substantially elliptical pattern are aligned.

Next, the controller 602 can select the direction of rotation 1510, and increment rotation between the spherical structure 102 and the housing 104 in 22.5° increments 1512, as illustrated in FIG. 16. This process can be repeated until the spherical structure 102 and the housing 104 are in a desired orientation relative to each other 1504 1506.

FIGS. 19 and 20 illustrate spherical motors in surface coupling arrangements with other objects, in accordance with the preferred embodiment of the present invention. Specifically, as shown in FIG. 19, a spherical structure 1902 of a spherical motor can couple rotational motion 1904 to another object 1906 that is mechanically coupled to the spherical structure 1902 via surface coupling. In a second example, as shown in FIG. 20, another spherical object 2004 may be frictionally coupled (surface to surface) to a surface of a spherical structure 2002 of a spherical motor. The other spherical object 2004 then delivers the rotational motion from the spherical structure 2002 to another object 2006 such as shown by the arrows 2008.

Thus, the embodiments of the spherical motor 100 shown and discussed above provide significant advantages over contemporary multiple independent drive motors for multi-axis rotational motion. The number of moving parts is significantly reduced, improving overall quality and serviceability. Additionally, the flexibility of the single spherical motor for multi-axis rotational motion extends well beyond the robotic joint application. An individual skilled in the art may apply this spherical motor to many different applications implementing multi-axis rotational motion. For example, the present invention is applicable to biomedical applications such as joint prosthesis. As a second example, the present invention is applicable in locomotion applications, such as for vehicular movement as a substitute for automobile tires to allow ease of maneuverability.

What is claimed is:

1. An apparatus for multi-axis rotational motion, comprising:
    a spherical structure;
    a housing at least partially enclosing the spherical structure and movably coupled thereto;
    a plurality of magnetically compliant poles mechanically coupled to one of the spherical structure and the housing; and
    magnetic drive means mechanically coupled to the other one of the spherical structure and the housing for magnetically imparting up to substantially 360 degrees of rotational motion between the spherical structure and the housing in multiple axes by magnetically interacting with the plurality of magnetically compliant poles.

2. The apparatus of claim 1, wherein the plurality of magnetically compliant poles comprises a plurality of fixed magnets of predetermined polarity and the magnetic drive means comprises a plurality of electro-magnets that can be singly or in a group selectively energized for magnetically interacting with the plurality of fixed magnets, and wherein the magnetic drive means can impart rotational motion between the spherical structure and the housing by selectively coupling electrical control pulses to the plurality of electro-magnets to selectively energize them.

3. The apparatus of claim 1, wherein the magnetic drive means comprises at least first and second magnetic drive poles arranged in the housing for magnetically interacting with the plurality of magnetically compliant poles for magnetically imparting up to substantially 360 degrees of rotational motion between the spherical structure and the housing in multiple axes.

4. The apparatus of claim 1, wherein at least one of the spherical structure and the housing couples the rotational motion to another object mechanically coupled thereto via surface coupling.

5. The apparatus of claim 1, further comprising control means coupled to the magnetic drive means for controlling the magnetic drive means for magnetically imparting up to substantially 360 degrees of rotational motion between the spherical structure and the housing along multiple axes.

6. The apparatus of claim 1, wherein the magnetic drive means comprises magnetic drive poles arranged about at least one substantially elliptical pattern, each magnetic drive pole capable of being individually energized for magnetically interacting with the plurality of magnetically compliant poles for imparting rotational motion between the spherical structure and the housing.

7. The apparatus of claim 1, wherein the magnetic drive means comprises magnetic drive poles arranged about first and second substantially elliptical patterns being located about opposing hemispheres of the spherical structure and oriented on a first axis for imparting rotational motion between the spherical structure and the housing about the first axis.

8. The apparatus of claim 7, wherein the magnetic drive means comprises magnetic drive poles arranged about third and fourth substantially elliptical patterns being located on a second axis about opposing hemispheres of the spherical structure, and wherein the first and third substantially elliptical patterns are located about a first hemisphere of the spherical structure and the second and fourth substantially elliptical patterns are located about a second hemisphere of the spherical structure that opposes the first hemisphere, and wherein magnetic drive poles that are arranged in similar orientation between the first and third substantially elliptical patterns and between the second and fourth substantially elliptical patterns, respectively, are energized and de-energized with each other, and magnetic drive poles that are arranged in opposing orientation between the first and second substantially elliptical patterns and between the third and fourth substantially elliptical patterns, respectively, are energized and de-energized with each other, for imparting rotational motion to the spherical structure about one of the first and second axes.

9. The apparatus of claim 1, further comprising:
at least one bearing mechanically coupled to the housing and the spherical structure and located therebetween.

10. The apparatus of claim 9, wherein the at least one bearing comprises at least one of a pneumatic bearing, a hydraulic bearing, a ball bearing, a sleeve bearing, and a sliding bearing.

11. A method for imparting multi-axis rotational motion between a spherical structure and a housing movably coupled thereto, a plurality of magnetically compliant poles being mechanically coupled to one of the spherical structure and the housing, and at least one magnetic drive pole being mechanically coupled to the other one of the spherical structure and the housing, the method comprising the step of:
energizing the at least one magnetic drive pole for magnetically interacting with at least one of the plurality of magnetically compliant poles for imparting up to substantially 360 degrees of rotational motion between the spherical structure and the housing in multiple axes.

12. The method of claim 11, wherein the plurality of magnetically compliant poles comprises a plurality of fixed magnets of predetermined polarity and the at least one magnetic drive pole comprises a plurality of electro-magnets that can be singly or in a group selectively energized for magnetically interacting with the plurality of fixed magnets, and wherein the energizing step comprises the step of:
energizing first and second electro-magnets of the plurality of electro-magnets located about opposing hemispheres of the spherical structure by selectively coupling electrical control pulses to the first and second electro-magnets to selectively energize them for magnetically interacting with at least first and second of the plurality of fixed magnets for imparting rotational motion between the spherical structure and the housing.

13. The method of claim 12, further comprising the step of:
frictionally coupling an outer surface of the spherical structure with a surface of an object for imparting the rotational motion of the spherical structure between the spherical structure and the surface of the object.

14. The method of claim 12, wherein the energizing step further comprises the steps of:
energizing third and fourth electro-magnets of the plurality of electro-magnets located at first and second angular distances from the respective first and second electro-magnets about opposing hemispheres of the spherical structure; and
de-energizing the first and second electro-magnets for magnetically interacting the first, second, third, and fourth electro-magnets with the plurality of fixed magnets for imparting rotational motion between the spherical structure and the housing.

15. A robotic end-effector drive mechanism, comprising:
a rotatable spherical structure having a plurality of magnetically compliant poles coupled thereto and arranged thereabout;
a housing at least partially enclosing the rotatable spherical structure;
a plurality of magnetic drive poles mechanically coupled to the housing and arranged therein for magnetically imparting up to substantially 360 degrees of rotational motion to the rotatable spherical structure in multiple axes by magnetically interacting with the magnetically compliant poles; and
mechanical coupling means coupled to the rotatable spherical structure for coupling the rotational motion of the rotatable spherical structure to a robotic end-effector.

16. The robotic end-effector drive mechanism of claim 15, wherein the mechanical coupling means comprises surface coupling between the rotatable spherical structure and a surface of an object for coupling the rotational motion of the rotatable spherical structure to a robotic end-effector.

17. The robotic end-effector drive mechanism of claim 15, wherein the plurality of magnetically compliant poles comprises a plurality of fixed magnets of predetermined polarity arranged about the outer surface of the rotatable spherical structure and the plurality of magnetic drive poles comprises a plurality of electro-magnets that can be singly or in a group selectively energized for magnetically interacting with the plurality of fixed magnets, and further comprising a controller electrically coupled to the plurality of electro-magnets for selectively energizing/de-energizing at least one of the plurality of electro-magnets for magnetically imparting rotational motion to the rotatable spherical structure.

18. The robotic end-effector drive mechanism of claim 14, wherein the plurality of magnetic drive poles is arranged about at least one substantially elliptical pattern, each magnetic drive pole capable of being individually energized for magnetically interacting with the plurality of magnetically compliant poles for imparting rotational motion to the rotatable spherical structure.

19. The robotic end-effector drive mechanism of claim 14, wherein the plurality of magnetic drive poles is arranged about first and second substantially elliptical patterns being located about opposing hemispheres of the rotatable spherical structure and oriented on a first axis for imparting rotational motion to the rotatable spherical structure about the first axis.

20. The robotic end-effector drive mechanism of claim 14, further comprising at least one bearing mechanically coupled to the housing and the rotatable spherical structure and located therebetween.

* * * * *